United States Patent [19]

Greten

[11] 4,192,417

[45] Mar. 11, 1980

[54] BOTTOM-BELT BUNKER FOR RECEIVING AND DELIVERING PARTICLES SERVING FOR THE MANUFACTURE OF FIBERBOARDS, CHIPBOARDS, OR THE LIKE

[75] Inventor: Berndt Greten, Springe, Fed. Rep. of Germany

[73] Assignee: Bison-Werke Bahre and Greten GmbH and Co. KG, Fed. Rep. of Germany

[21] Appl. No.: 700,023

[22] Filed: Jun. 25, 1976

[30] Foreign Application Priority Data

Jun. 25, 1975 [DE] Fed. Rep. of Germany ....... 2528391

[51] Int. Cl.² .............................................. B65G 47/72
[52] U.S. Cl. .................................... 198/601; 198/631; 198/669; 198/750
[58] Field of Search ............... 198/364, 370, 371, 585, 198/601, 631, 669, 750; 214/17 R, 17 C; 119/52 B; 414/300

[56] References Cited

U.S. PATENT DOCUMENTS

| 3,428,027 | 2/1969 | Haen et al. | 198/750 |
| 3,559,893 | 2/1971 | Gruben | 198/669 |
| 3,605,700 | 9/1971 | Gillette | 198/750 |

*Primary Examiner*—Joseph E. Valenza
*Attorney, Agent, or Firm*—Craig and Antonelli

[57] ABSTRACT

A bottom-belt bunker which receives and delivers particles for the manufacture of fiberboards, chipboards, or the like, and containing cellulose, is disposed upstream of a glue applicator or a front of a forming station. A centrally located feed opening is associated with a drivable auger disposed transverse to the longitudinal extension of the bunker. The auger has a pair of opposed helical blades or flights. A shoveling slide having an adjustable stroke is disposed beneath the auger and partially encompasses the same, the length of the slide being smaller than half the width of the bunker and/or half the length of the auger. Terminal positions of the reciprocating slide are disposed at a spacing from the side of the bunker and the average moving speed of the slide is approximately half that of the velocity of the helical blades of the auger.

3 Claims, 3 Drawing Figures

BOTTOM-BELT BUNKER FOR RECEIVING AND DELIVERING PARTICLES SERVING FOR THE MANUFACTURE OF FIBERBOARDS, CHIPBOARDS, OR THE LIKE

FIELD OF THE INVENTION

The present invention relates to a bottom-belt bunker for receiving and delivering particles serving for the manufacture of fiberboards, chipboards, or the like, and containing lignocellulose, these particles being optionally provided with binders. Such bottom-belt bunkers are arranged upstream of the glue applicators as well as in front of forming stations which feed the particles to a movable support, for example, in accordance with the throw screening or air classifying methods, respectively.

BACKGROUND OF THE INVENTION

Bottom-belt bunkers as disclosed, for example, in German Patent 1,816,212 wherein, in front of a delivery point, one or more levelling rakes or the like are provided for equalizing the material present in the bunker for such material could not be distributed evenly over the cross section of the bottom-belt bunker since the material fed thereto is charged by way of endless conveyor belts which are pivotable about at least one vertical axis and additionally displaceable to and fro over the bunker Offenlegungsschrift No. 2,335,814.

BRIEF DESCRIPTION OF THE INVENTION

The present invention is based on the problem of introducing the material in layers into such a bunker so that the filled-in material is flawlessly uniformly distributed in the transverse as well as longitudinal directions of the bottom belt associated with the bunker so that no separation occurs. A bottom-belt bunker for solving this problem is characterized in that a centrally arranged feed opening of the bunker is associated with a conventional, drivable auger extending transversely to a longitudinal extension of the bunker which auger has identical, oppositely oriented helical flights. A shoveling slide, having an adjustable stroke, is disposed underneath the auger and partially encompasses the latter with the length of the shoveling slide being smaller than half the width of the bunker and/or half the length of the auger. The terminal positions of the reciprocating shoveling slide are located at a spacing from the sidewalls of the bunker and the average moving speed of the slide is approximately half as great as the conveying velocity of the helical flights.

Augers having identical, oppositely oriented helical flights have been known in bunkers without an endless bottom belt, for example, in French Patent No. 2,041,705 and Auslegeschritt 1,031,724. These known augers merely serve for the filling of these bunkers and take care of filling the bunkers completely and are not fixedly provided within the bunker but rather are movable as well as pivotable.

DETAILED DESCRIPTION OF THE INVENTION

Figure 1:
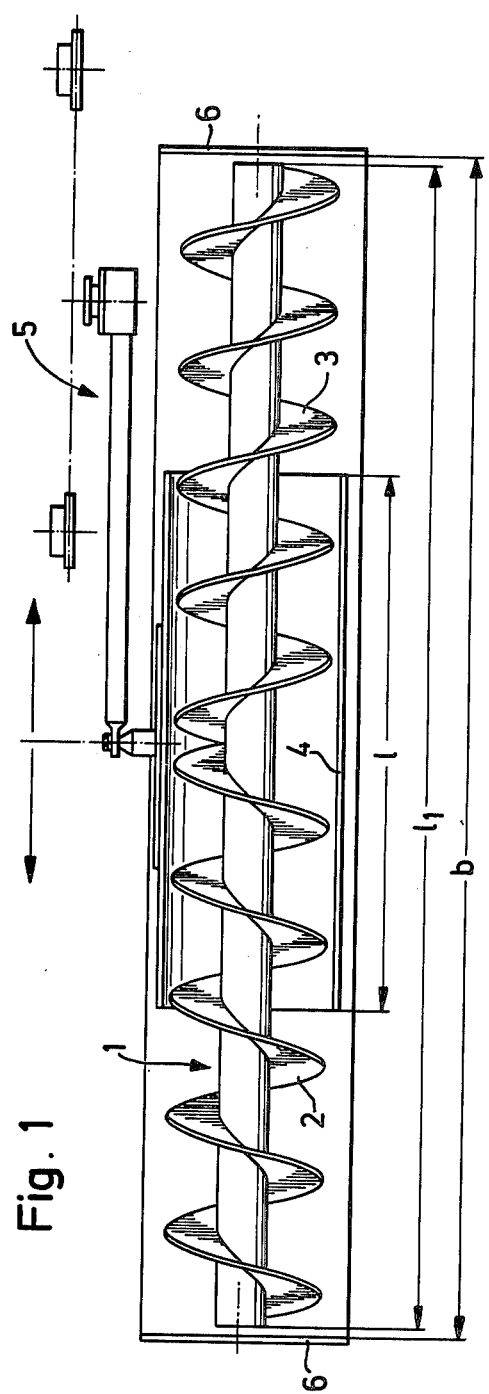
FIG. 1 is a partial plan view of a bunker with a device constructed in accordance with the invention and showing the drive mechanism for the shoveling slide.
Figure 2:
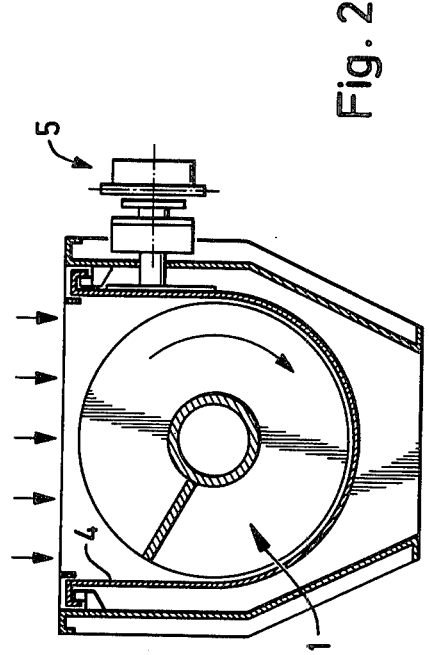
FIG. 2 is a cross sectional view, on an enlarged scale, through the device of FIG. 1.

In the upper zone of a bottom-belt bunker, not shown in detail, an auger 1 extends at right angles to the moving direction of the bottom belt of this bunker with the auger 1 having identical, oppositely oriented helical flights 2 and 3. The auger 1 is partially encompassed by a shoveling slide 4, the length l of which is somewhat smaller than half the width b of the bunker and/or half the length $l_1$ of the auger 1. If, for example, the width b of a bottom-belt bunker or the length $l_1$ of the auger is, respectively, 2600 mm., then the length l of the slide is approximately equal to 1200 mm., i.e. about 100 mm. shorter than half the bunker width and/or the length of the auger. This length l should be variable and/or adjustable within relatively narrow limits, in order to be able to adjust the length of the slide 4, depending on the material or the like to be processed, so that the posed task is flawlessly accomplished.

While the auger 1 can be rotatably driven by means of a motor through a transmission and a coupling unit, which has not been illustrated so that the illustration remains clear, the slide 4 can be reciprocated, for example by means of a conventional push rod drive mechanism 5, and this is effected at an average speed which is about half as high as the conveying speed of the helical flights 2 and 3, respectively. The slide drive mechanism is fashioned so that the slide 4 is reciprocated between terminal positions which have a certain spacing from the sidewalls 6 of the bunker which spacing in the aforementioned examples indicating dimensions, spacing is about 100 mm.

Figure 3:
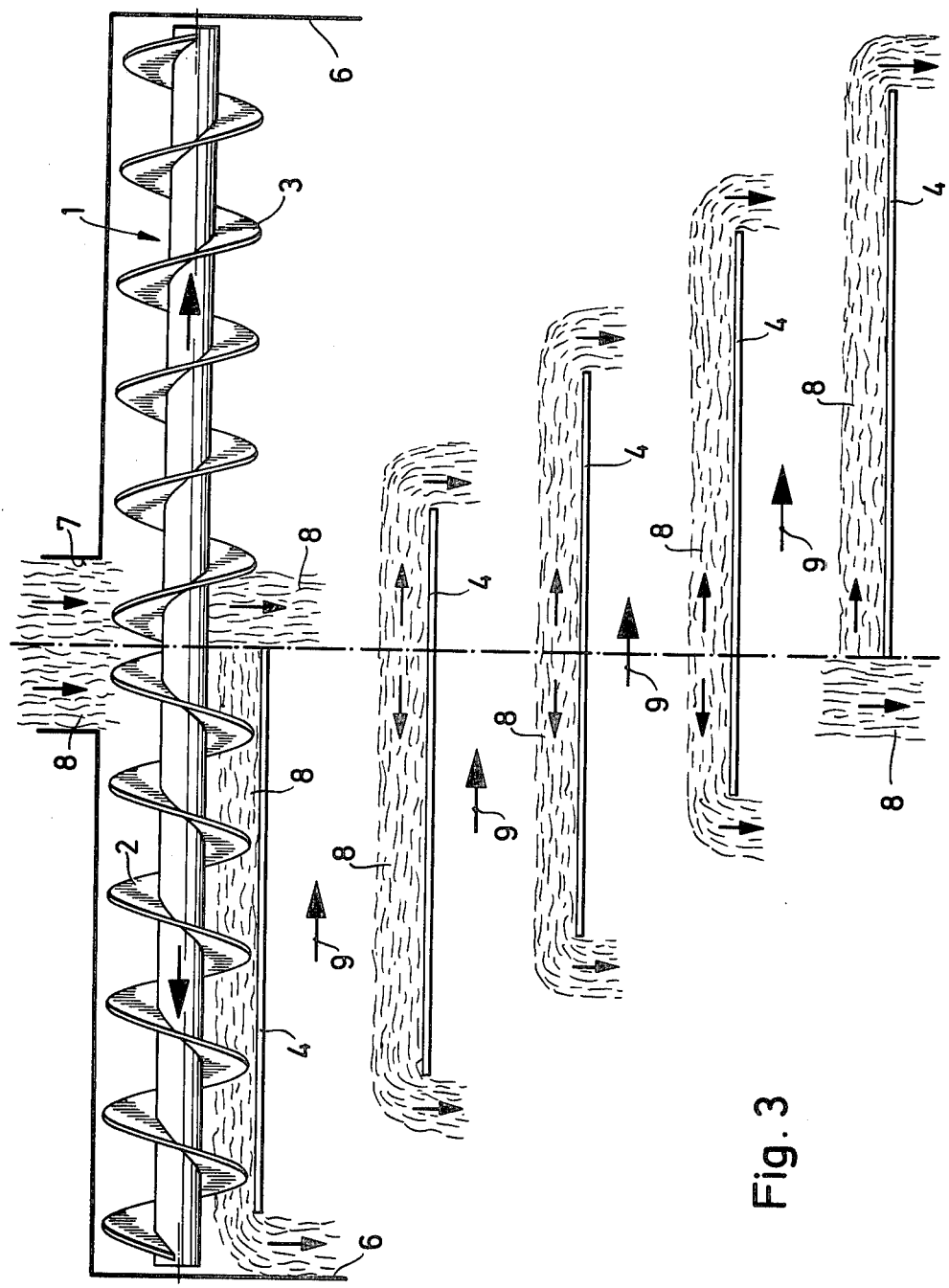
FIG. 3 is an illustration of the motion cycles, wherein the positions of the slide are represented in staggered relationship one below the other.

As shown in FIG. 3, if the material 8 to be distributed is fed to the device of this invention by way of a centrally located feed opening 7, and if the slide 4 is in the middle position between its two terminal positions, then the bulk material 8 will fall onto the slide 4 and will be distributed simultaneously into opposite directions by the screw flights. Once the slide 4 has reached its left-hand end position, illustrated at the top of FIG. 3, a portion of the filled-in bulk material 8 is deposited over the slide 4 as well as directly into the bunker space onto the bottom belt. During the backward motion of the slide 4, along the direction of arrows 9, the bulk material 8 is distributed over the end edges of the slide 4, as illustrated by the subsequent positions of the slide, until finally, in the right-hand end position of the slide, the bulk material 8 is deposited directly by the auger 1 in the direction toward the bottom belt.

As a result, an extremely uniform distribution of the bulk material 8 is attained over the entire width of the bunker and/or the bottom belt, without the occurrence of any separation.

It is advantageous to provide the helical flights with a relatively minor pitch. Of course, the auger must be driven so that any clogging of the feed opening is avoided.

I claim:

1. Bottom-belt bunker for receiving and delivering particles serving for the manufacture of fiberboards, chipboards, or the like, and containing lignocellulose, these particles being optionally provided with binders, the bunker being located upstream of a glue applicator or in front of a forming station, characterized in that, for a pouring of uniform layers of a width corresponding to the width of the bunker, a centrally located feed opening is associated with a conventional, drivable auger arranged transversely to a longitudinal extension of the bunker, the auger having identical, mutually opposed helical flights; that a shoveling slide with an adjustable stroke is arranged underneath the auger and partially encompasses the auger, the shoveling slide having a length which is smaller than half the width of the bunker and/or half the length of the auger; that terminal positions of the reciprocating slide are located at a spacing from sidewalls of the bunker; and that an average moving speed of the slide is approximately half as great as a conveying velocity of the helical flights.

2. Bottom-belt bunker according to claim 1, characterized in that the helical flights of the auger have a relatively minor pitch.

3. The improvement according to claim 1, wherein adjacent ends of said mutually opposed helical flights are located midway beneath said central opening.

* * * * *